United States Patent [19]

Borah et al.

[11] Patent Number: 5,283,676
[45] Date of Patent: Feb. 1, 1994

[54] LIQUID CRYSTAL LIGHT VALVE

[75] Inventors: Thomas C. Borah, Vista; Javier A. Ruiz, Oceanside, both of Calif.

[73] Assignee: Hughes-JVC Technology Corporation, Carlsbad, Calif.

[21] Appl. No.: 59,511

[22] Filed: May 10, 1993

Related U.S. Application Data

[63] Continuation of Ser. No. 699,123, May 13, 1991, abandoned.

[51] Int. Cl.$^5$ ............... G02F 1/1335; G02F 1/135; G02F 1/13
[52] U.S. Cl. .................................. 359/67; 359/71; 359/72; 359/99
[58] Field of Search ............ 359/67, 70, 71, 72, 359/99

[56] References Cited

U.S. PATENT DOCUMENTS

| | | | |
|---|---|---|---|
| 3,882,039 | 5/1975 | Sprokel | 359/99 |
| 4,012,119 | 3/1977 | Adams et al. | 359/72 X |
| 4,066,569 | 1/1978 | Lim | 252/299.5 |
| 4,091,847 | 5/1978 | Sorkin | 359/99 |
| 4,127,322 | 11/1978 | Jacobson et al. | 353/31 |
| 4,191,456 | 3/1980 | Hong et al. | 353/31 |
| 4,343,535 | 8/1982 | Bleha, Jr. | 350/342 |
| 4,366,080 | 12/1982 | Mizunoya et al. | 252/299.3 |
| 4,650,286 | 3/1987 | Koda et al. | 350/331 R |
| 5,056,895 | 10/1991 | Kahn | 359/71 |
| 5,177,628 | 1/1993 | Moddel et al. | 359/72 |

OTHER PUBLICATIONS

Margerum, J. David, et al.; "Factors Affecting The Anisotropic And Dynamic Scattering Characteristics Of An Ester Mixture"; *Mol. Cryst. Liq. Cryst.*; 1984, vol. 111, pp. 135–159.

*Primary Examiner*—William L. Sikes
*Assistant Examiner*—Ron Trice
*Attorney, Agent, or Firm*—Harness, Dickey & Pierce

[57] ABSTRACT

Creation of DC fields in a liquid crystal light valve caused a DC induced transient optical phenomenon in which output brightness level undergoes a change as the DC fields are redistributed within the liquid crystal light valve. Adverse effects of the DC induced transient optical output are minimized by employing a liquid crystal material of greatly decreased resistivity, which reduces the time constant of the liquid crystal device, making it comparable to the response time of the liquid crystal material itself.

14 Claims, 3 Drawing Sheets

LIQUID CRYSTAL LIGHT VALVE

This is a continuation of U.S. patent application Ser. No. 07/699,123, filed May 13, 1991, entitled IMPROVED LIQUID CRYSTAL LIGHT VALVE, now abandoned.

BACKGROUND OF THE INVENTION

1. Field of the Invention

This invention relates to reflective light valve systems and more particularly concerns decreasing DC induced transient optical effects in a liquid crystal light valve.

2. Description of Related Art

The liquid crystal light valve (LCLV) is a thin film, multi-layer structure comprising a liquid crystal layer, a dielectric mirror layer, a light blocking layer and a photosensitive layer, all sandwiched between two transparent electrodes. In a typical reflective LCLV projection system, a high intensity polarized projection beam is directed through the liquid crystal layer to the dielectric mirror. An input image of low intensity light, such as that generated by a cathode ray tube, is applied to the photosensitive layer, thereby switching the electric field across the electrodes from the photosensitive layer onto the liquid crystal layer so as to selectively activate the liquid crystal according to the intensity of input light received at different areas of the photosensitive layer. Linearly polarized projection light from a high power light source, such as a Xenon lamp, passes through the liquid crystal layer and is reflected from the dielectric mirror. The light reflected from the mirror is polarization modulated by the liquid crystal in accordance with the light information incident on the photo responsive layer. Therefore, if a complex distribution of light, for example a high resolution input image from a cathode ray tube, is focused onto the photosensitive layer surface, the liquid crystal light valve converts the low intensity input image into a replica image which can be reflected for projection with magnification to produce a high brightness image on a viewing screen. Projection systems of this type are described in several U.S. patents, including U.S. Pat. Nos. 4,650,286 to Koda, et al for Liquid Crystal Light Valve Color Projector; 4,343,535 to Bleha, Jr. for Liquid Crystal Light Valve; 4,127,322 to Jacobson, et al for High Brightness Full Color Image Light Valve Projection system; and 4,191,456 to Hong, et al for Optical Block For High Brightness Full Color Video Projection System.

The photo sensitive layer of the liquid crystal light valve, whether a silicon photo sensor or a cadmium sulphide photo sensor, exhibits rectifying and photo voltaic properties that cause DC offsets within the liquid crystal light valve. These DC offsets, which transiently vary as they adjust to an equilibrium condition, result in spurious transient optical output intensities ("overshoot") that degrade operation of the light valve. This overshoot effect is particularly noticeable when input light is switched between off and on. As output light intensity increases when input light is switched on, output intensity momentarily and undesirably increases to a level beyond the steady state because of the DC induced transient overshoot. Applicants are not aware of any prior methods for handling this problem.

Accordingly, it is an object of the present invention to avoid or minimize effects of DC induced transient optical effects in a liquid crystal light valve.

SUMMARY OF THE INVENTION

In carrying out principles of the present invention in accordance with a preferred embodiment thereof a liquid crystal light valve employs a liquid crystal material having a significantly decreased resistivity. This decreased resistivity provides a much shorter time constant for the liquid crystal material of the light valve, which causes a significant decrease in both magnitude and duration of the transient optical effects that are induced by the DC voltages. In particular the liquid crystal material of the multi-layered liquid crystal light valve structure is caused to have a significantly lowered resistivity, so that the DC voltage effects the liquid crystal material only for a very small time, a time that is comparable to the response time of the liquid crystal itself. Therefore, optical overshoot is not noticeable. According to another feature of the invention the liquid crystal resistance is arranged to be lower than the resistance of at least one other element of the light valve structure so as to eliminate almost all long range exposure of the liquid crystal to the DC and thereby avoid shortening liquid crystal life.

DESCRIPTION OF THE PREFERRED EMBODIMENT

Figure 1:
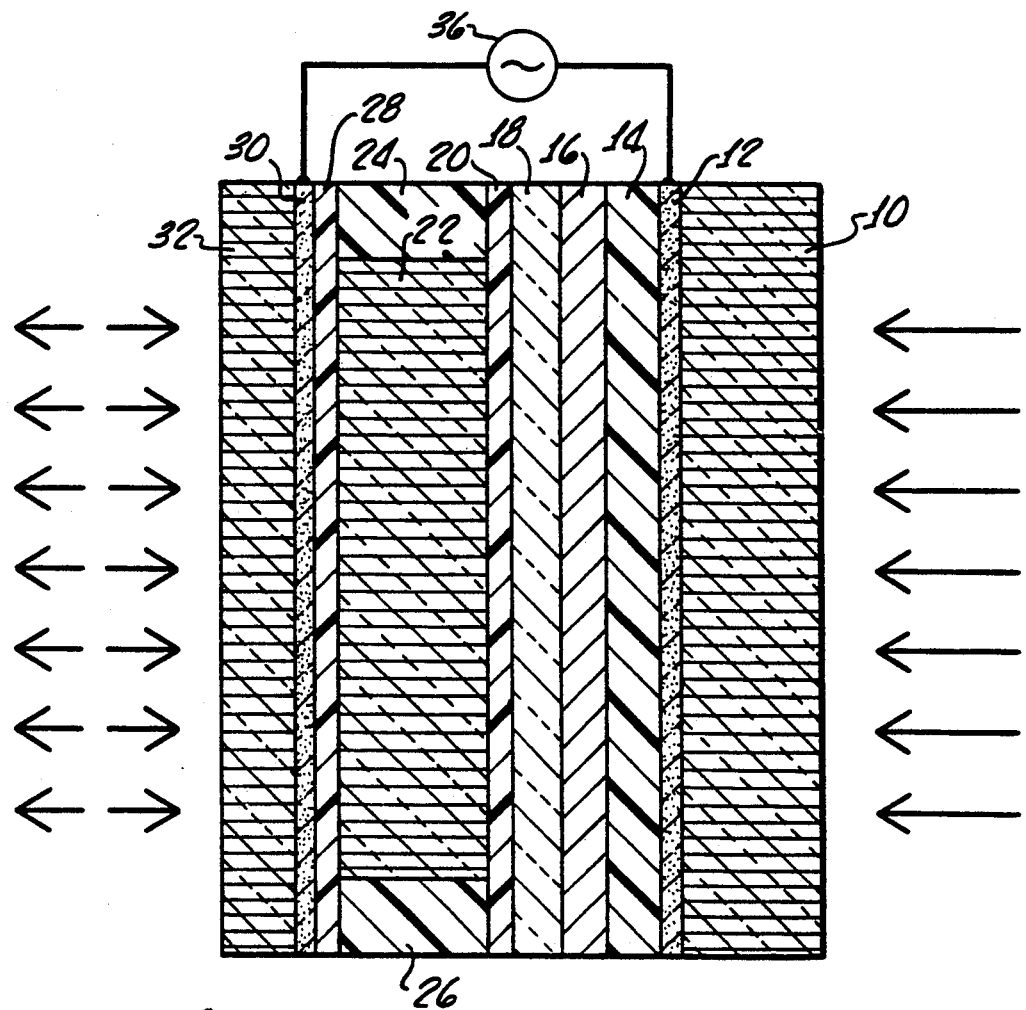
FIG. 1 is a schematic cross section of an exemplary liquid crystal light valve structure.

Illustrated in FIG. 1, for purposes of exposition, is a schematic cross section of a typical AC biased silicon liquid crystal light valve (LCLV) of the prior art. It is to be noted that the invention described herein applies equally well to a liquid crystal device having a cadmium sulphide photosensitive layer. The LCLV is a multilayer structure composed of a stack of dielectric materials of varying resistivities and thicknesses. From right to left the cross section illustrated in FIG. 1 includes an input structure 10, which may be the fiber optic face plate of a cathode ray tube for example, a transparent conductive primary electrode 12, of indium tin oxide, for example, a photo sensitive layer 14 of amorphus silicon, a light blocking or light absorbing layer 16 of cadmium telluride, a dielectric mirror 18 of alternating layers of silicon dioxide and titanium dioxide, a first liquid crystal alignment film 20 of silicon dioxide, a nematic liquid crystal material 22 (such as Merck ZLI-4330) confined between peripheral spacer pads 24 and 26, a second liquid crystal alignment film 28 of silicon dioxide, a transparent conductive counter electrode 30, and an output quartz window 32. Bonding layers (not shown) of cadmium telluride and silicon dioxide are provided between layers 14 and 16 and between layers 16 and 18 for proper adherence of these layers. Typical thicknesses of the materials in an exemplary LCLV are as follows: the silicon photo sensor layer - 30 micrometers, the cadmium telluride blocking layer - 2.2 micrometers, the dielectric mirror - 2 micrometers, the liquid crystal layer - 4 micrometers, and each silicon dioxide alignment film - 0.3 micrometers.

The light valve is provided with an audio frequency voltage signal from a source 36 connected to the primary and counter electrodes 12 and 30, which establishes an alternating current or AC bias across the multilayer structure. This voltage is typically adjusted to the voltage at which the liquid crystal layer is at its threshold. The optically addressed light valve is provided with a varying optical input of relatively low intensity in the form of writing light from the fiber optic face plate 10 via a cathode ray tube (not shown). The writing light is applied through the transparent conductive primary electrode 12 to the photo sensitive layer 14, which generates a DC voltage according to intensity of light received at different areas thereof and reduces the AC impedance of the layer causing an increase in the AC voltage dropped on the liquid crystal layer. With application of the voltage from the photosensitive layer, the audio frequency induced voltage is augmented and a voltage above its threshold is applied to the liquid crystal, which changes orientation of its molecules. This writing light induced orientation causes changes of the polarization state of reading light passing through (and reflected from) the liquid crystal layer to be changed at different areas according to the spatial pattern at voltage produced by the photosensitive layer. A high intensity polarized reading light is applied through quartz window 32 through the nematic liquid crystal layer to be reflected from dielectric mirror 18 back through the liquid crystal to produce an output optical image with a polarization pattern determined by the polarization state of the different areas of the liquid crystal layer. Thus a high intensity optical image of the writing light pattern is produced for display.

Figure 2:
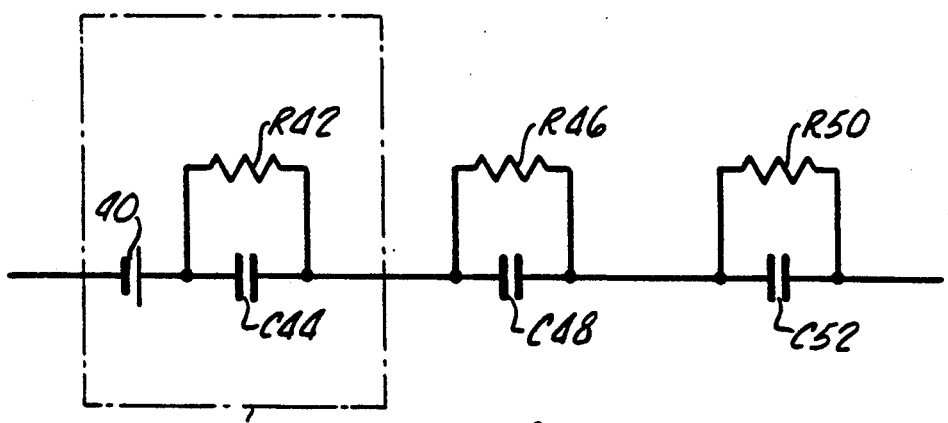
FIG. 2 is an equivalent electrical circuit of the light valve of FIG. 1.

FIG. 2 illustrates the equivalent leaky capacitor electric circuit elements of the multi-layer liquid crystal light valve structure of FIG. 1. In this electric circuit the rectifying nature of the photosensitive silicon layer causes a DC offset to occur, and is therefore considered and shown as a battery in series with the films of the device in this representation. The various materials have greatly varying dielectric and resistive properties, as can be seen in the following table that illustrates properties of one example of a prior LCLV.

TABLE I

| FILM MATERIAL | DIELECTRIC CONSTANT | RESISTIVITY OHM-cm | TYPICAL THICKNESS |
|---|---|---|---|
| Silicon Dioxide | 3.6 | >1E14 | 1.8 um |
| Titanium Dioxide | 60 | 1E14 | .7 um |
| Cadmium Telluride | 10.2 | 3E7 | 2.2 um |
| Amorphous Silicon | 10.5 | 1E12 (Dark) 1E7 (Light) | 30 um |
| Liquid Crystal | 3.5-5.4 | 2E11 | 4 um |

From these values of resistivities and typical thicknesses the lumped impedances of resistive and capacitive components for a ¼ inch spot (pixel) area of the liquid crystal light valve ca be calculated. In such calculation all of the layers, excluding the photo sensitive silicon and the liquid crystal, are lumped into an electric element referred to as the mirror. Accordingly, the "mirror" in these calculations includes the light blocking cadmium telluride layer (which isolates the photosensitive layers from the high intensity reading light), the bonding layers (between layers 14, 16 and 16, 18 —not shown in FIG. 1) and the dielectric mirror. The calculated values are shown in the following table for the illustrated equivalent electric circuit of FIG. 2. FIG. 2 shows a 0.3 volt battery 40, representing voltage generated by the photosensitive silicon layer in the presence of input illumination, and a parallel circuit of resistor R42 and capacitor C44 representing the silicon layer 14. The "mirror" components, including mirror 18, light blocking layer 16, and the overcoats or electrode layers, are indicated by the parallel circuit of resistor R46 and capacitor C48. The liquid crystal is indicated by the parallel combination of resistor R50 and capacitor C52. Values of the several components of the leaky circuit of FIG. 2 are listed in the following table.

TABLE II

| COMPONENT | IMPEDANCE |
|---|---|
| R42 | 3.8E5 ohms |
| R46 | 3E11 ohms |
| R50 | 2E9 ohms |
| C44 | 40 pF |
| C48 | 107 pF |
| C52 | 67 pF |

The following discussion will assist in understanding the nature of the present invention. When a DC voltage is applied to or generated in the LCLV, this voltage is divided instantly among the series capacitive elements (of the equivalent circuit) in proportion to their relative capacitances. As soon as these voltages develop on the capacitors a leakage current through the capacitors begins to flow. Because of the disparity in the leakage resistances of the capacitors, charges will accumulate at the more resistive elements. This charge redistribution continues until the voltages on each capacitor satisfy an equilibrium condition in which the equilibrium voltages on the capacitors are determined by the relative resistances without regard to the capacitances. The capacitances only determine magnitude of the initial voltages and the equilibration time constants.

Figure 3A:
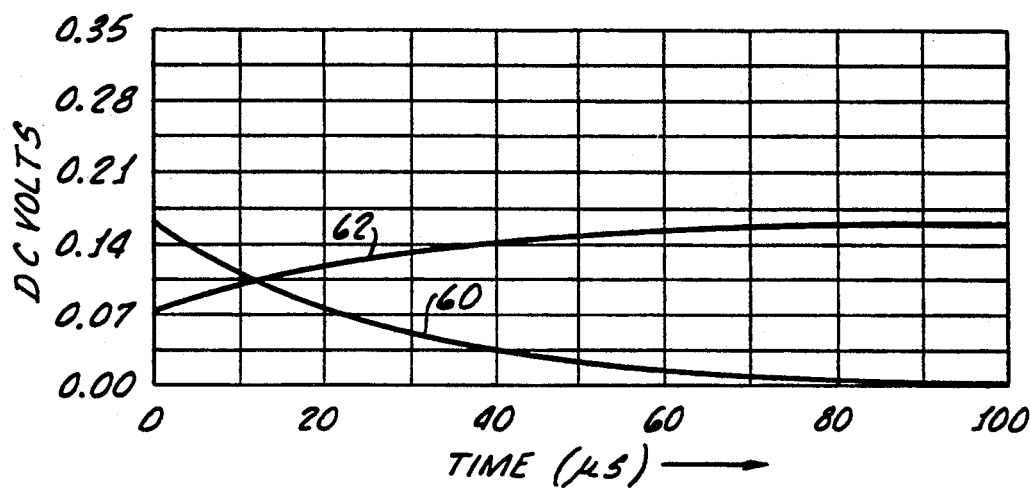
FIGS. 3a and 3b illustrate initial redistribution of DC voltages among various LCLV layers.
Figure 3B:
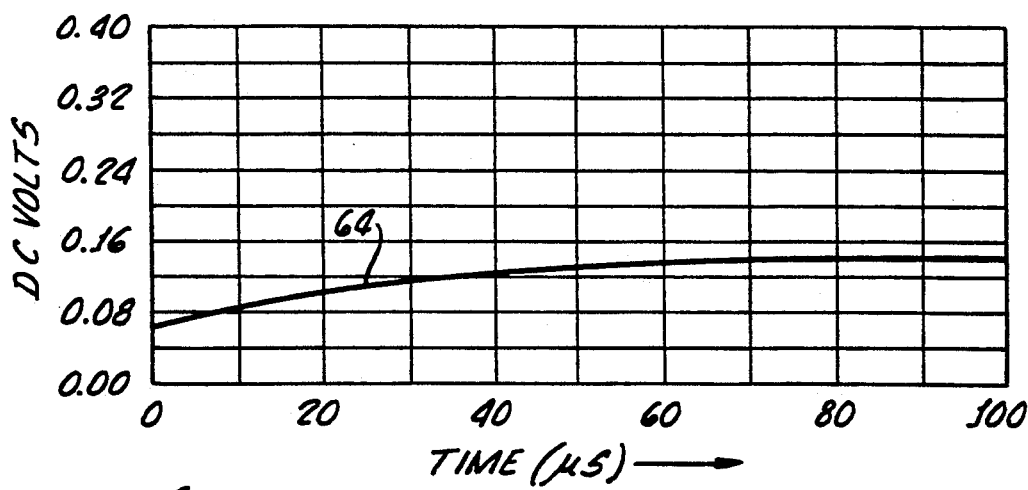

FIGS. 3a and 3b show curves representing initial redistribution of DC voltages among the various LCLV elements in the first 100 microseconds following occurrence of a DC voltage. FIG. 3a shows the silicon photo sensor curve 60, and also shows the liquid crystal DC voltage at curve 62. FIG. 3b shows the mirror voltage at curve 64.

Figure 4A:
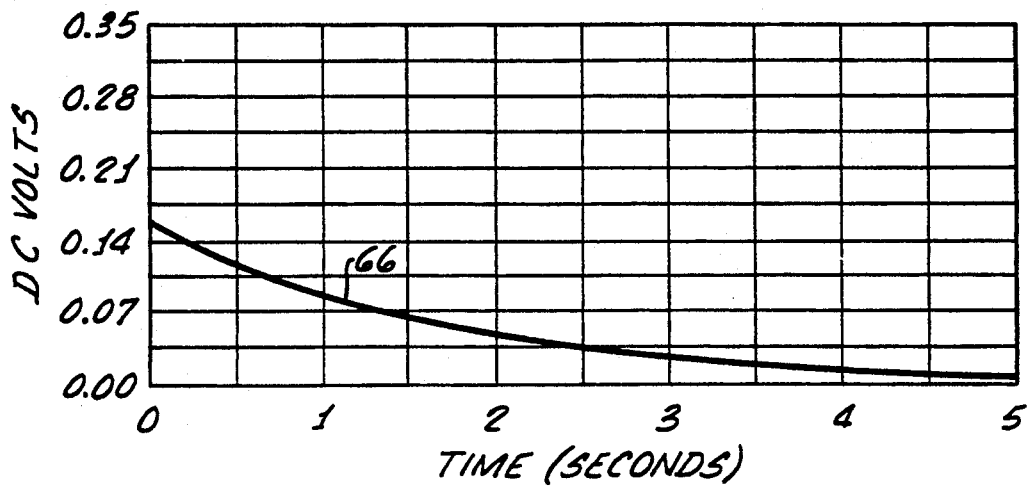
FIGS. 4a and 4b illustrate equilibrium DC voltages on several of the LCLV layers.
Figure 4B:
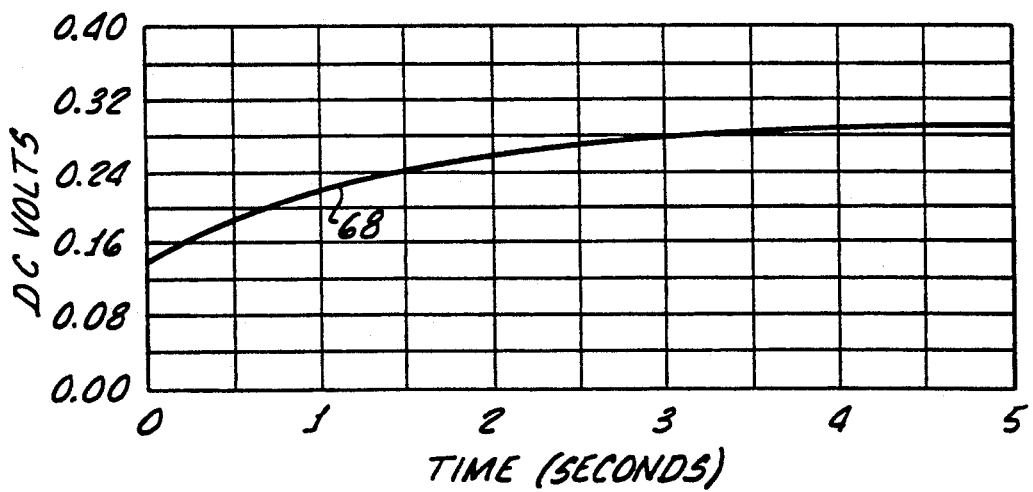

FIGS. 4a and 4b show the equilibrium voltages over a 5 second period for the liquid crystal shown by curve 66, and the mirror shown by curve 68. The silicon photo sensor voltage is essentially zero over the entire period of FIG. 4a.

The time required for equilibration to take place depends on the specific circuit but is most strongly determined by the resistances in parallel with the capacitors. The higher the resistance the longer it takes to reach the equilibrium condition. In a previously used standard liquid crystal composition, with input light applied to the silicon sensing film, the resistivity of the latter is so low that the DC level on the silicon drops to 0 in less than 100 microseconds, as can be seen in FIG. 3a, thereby shifting its voltage to the mirror and liquid crystal layers. The shift of voltage from the liquid crystal to the mirror requires 5 seconds for this prior liquid crystal, as can be seen in FIGS. 4a and 4b.

Because the liquid crystal layer changes its effect on polarization state of light transmitted through the material when a voltage above threshold is present, the presence of this DC voltage causes the output light (selected for transmission by a polarization analyzer) to rapidly increase to a peak (due to the rapid capacitive distribution) and then to slowly decrease and return to the normal or original transmission level (e.g. which existed prior to the application of the DC voltage). This slow recovery time is the time in which the charges redistribute through the circuit of FIG. 2, so that virtually all of the voltage will finally reside on the very high resistance dielectric mirror. Accordingly, until the charges are redistributed, the liquid crystal experiences a transient DC voltage and induces spurious overshoot of output illumination. The reverse effect occurs when the DC voltage is removed and the charge build-up must again redistribute in the device. A reversed polarity DC voltage appears on the liquid crystal causing the output level to again rapidly increase to a peak (capacitive division) and then slowly decrease and return to the normal level.

In a liquid crystal light valve under normal operation a DC voltage is developed when input light illuminates the photo sensor. It is found that the magnitude of the DC level produced in the LCLV in response to input light depends upon the wavelength (color) of the input light, with a peak in this DC level at a particular input light wavelength for the audio frequency photo response and a peak in the DC at an input light wavelength approximately 60 nanometers lower than the wavelength of input light at which the audio frequency photo response peaks.

The described overshoot caused by the DC in the LCLV is greatest at an input illumination wavelength near this peak DC wavelength. Further, the transient increase in output illumination described above occurs most noticeably when input light is toggled between off and on after a period of seconds (>5) with no input light illumination.

In summary, the DC charge on the conventional liquid crystal is relatively slowly transferred to the high resistance mirror, and thus the liquid crystal remains stimulated (by an above its threshold voltage) for a longer time to thereby provide a more noticeable overshoot of the output illumination. In addition, in the equilibrium state, the maximum charge resides on the layer with the highest resistance. Consequently, if the liquid crystal resistance is significantly lower than the highest resistance, it will not experience long term DC voltages, which voltages could significantly shorten its life.

In accordance with the present invention the liquid crystal is caused to have a greatly decreased time constant (e.g. RC charging time constant) so that the DC on the liquid crystal is rapidly transferred to the high resistance mirror. Consequently, both magnitude and duration of the transient increase in output illumination are reduced. This reduction is accomplished by adjusting relative resistivities of the several layers. Other factors that affect resistance, such as layer thickness, cannot be changed by an amount that could cause a useful reduction (e.g. in the order of 100 times) of resistance. By lowering resistivity of the crystal layer 100 to 1,000 times, for example, its RC charging time constant is reduced by 100 to 1,000 times, and therefore the time required to transfer charge from the liquid crystal (curve 66 of FIG. 4a) to the mirror (curve 68 of FIG. 4b) is greatly reduced and becomes more nearly equal to the response time of the liquid crystal. Reducing the time to transfer this charge reduces the duration of overshoot in the output illumination to a value more nearly the same as the liquid crystal response time.

The response time of the liquid crystal itself, that is, the rate of change of output illumination in response to a step input illumination is between about 10 and 30 milliseconds for a typical liquid crystal. By decreasing resistivity of the liquid crystal 100 to 1,000 times, the time constant of the liquid crystal is so greatly reduced and becomes so close to its response time that any DC induced transient overshoot is of too short a duration to noticeably affect the LCLV output.

Typically, the room temperature resistivity of a pure liquid crystal mixture is greater than 1E11 ohm-cm. To achieve the low resistivity value of 3E9 ohm-cm, dopants are added to the liquid crystal. Dopants useful for this purpose are described in a paper by J. David Margerum et al, "Factors Affecting the Anisotropic and Dynamic Scattering Characteristics of an Ester Mixture", published in Molecular Crystal Liquid Crystal, 1984 Vol. III, pp. 135-139. This paper describes addition of various dopants for the purpose of enhancing the hydroelectrodynamic effect employed in dynamic scattering liquid crystal devices. Margerum does not suggest and was not aware of the benefits of lowered resistivity of the liquid crystal in reducing DC induced transient optical effects of a field effect light valve. Among such dopants are:

a) Tetrabutylammonium trifluoromethanesulfonate (TBATMS)

b) Ethylpyridinium tetraphenylboride (EPTPB)

c) Tetrabutylammonium tetraphenylboride (TBATPB)

d) Dibutylferrocene (DBP)

e) (2, 4, 7 Trinitrofluorenylidene)-malononitrile (TFM)

In an embodiment of the present invention, TBATMS was selected as the dopant to be added. This dopant may be added to a liquid crystal mixture of many known types. A liquid crystal mixture ZLI-4330 made by E. Merck is one of many that may be employed in practice of this invention. This dopant is electrochemically stable and will not irreversibly react at the electrodes under normal AC operation.

TBATMS was prepared by reaction of triflouromethane-sulfonic acid and tetrabutylammonium bromide and was purified by recrystallization from water and dried. The dopant was added to the pure liquid crystal mixture to form a 1E-3 to 4E-5 molar TBATMS mixture. The dopant was added to the liquid crystal mixture by heating the liquid crystal and dissolving the dopant. After cooling the mixture was filtered to remove particulates.

The dopant is added so as to decrease resistivity of the resultant liquid crystal to at least as low as 5E9 ohm-cm. Preferably, sufficient dopant is added to achieve a resistivity of 2.5E9 ohm-cm, which is about one one-hundredth of the resistivity of the typical liquid crystal. The amount of dopant required to achieve 2E9 ohm-cm resistivity is not too close to the solubility limit so that reduction of temperature is less likely to cause some of the dopant to precipitate out of solution, resulting in cosmetic problems as well as increase in the liquid crystal resistivity. Preferably, with this low resistivity liquid crystal, and with a 0.3 volt DC offset applied, the liquid crystal exhibits a 50 millisecond recovery time from the DC, as compared to a recovery time of 5 to 10 seconds for the prior undoped liquid crystal. Moreover, when tested with input light no detectable DC overshoot effect is observed in an LCLV Using the lowered resistivity liquid crystal.

An additional advantage of the use of low resistivity liquid crystal derives from the fact that its resistance becomes significantly lower than the resistance of the mirror. Therefore, the amount of time during which the liquid crystal is exposed to the DC voltage is greatly decreased. This means that the life of the liquid crystal is increased because of the lesser deleterious effects of the shorter duration application of DC voltage. With such a low resistance of the liquid crystal, the DC level shifts to and, in equilibrium state, remains on the highest resistance element, which is generally the dielectric mirror or other high resistance layer, so that the liquid crystal has virtually no long range DC exposure. Accordingly, to improve the life of the liquid crystal it is used in a liquid crystal light valve or other multi-layer structure in which at least one other layer has significantly higher resistance. The mirror lump sum resistance should be at least ten times, and preferably one hundred times, that of the liquid crystal. In other words, the liquid crystal layer must not have the highest resistance of the several layers of the structure if liquid crystal life is to be maximized.

There has been described an AC biased liquid crystal light valve in which the resistance of the liquid crystal, and accordingly its RC charging time constant, is made considerably smaller so as to decrease a transient output illumination overshoot that is induced by a DC voltage in the multi-layer structure.

What is claimed is:

1. A liquid crystal field effect light valve comprising:
   a layered assembly including:
      a pair of transparent conductive electrodes,
      a liquid crystal layer having a predetermined response time,
      a mirror layer,
      a photosensitive layer, wherein said liquid crystal, mirror and photosensitive layers all being sandwiched together between said transparent conductive electrodes, and wherein the resistivity of said liquid crystal layer is sufficiently low to cause the liquid crystal layer to have a time constant nearly the same as said response time; and
      means for applying an alternating current across said layered assembly.

2. The liquid crystal light valve of claim 1 wherein said liquid crystal has a maximum resistivity of about $5 \times 10^9$ ohm-cm.

3. The liquid crystal light valve of claim 1 wherein said liquid crystal has a resistance that is at least about 100 times less than the resistance of at least one of the photosensitive and mirror layers.

4. The light valve of claim 1 wherein said liquid crystal has a resistance that is between one hundredth and one thousandth of the resistance of at least one of said photosensitive and mirror layers.

5. An AC biased liquid crystal field effect light valve having:
   a plurality of layers including a photosensitive layer and a liquid crystal layer that has a predetermined response time,
   said liquid crystal layer having a resistivity of a sufficiently low value to cause the time constant of said liquid crystal layer to be substantially equal to the response time of the liquid crystal layer.

6. A liquid crystal field effect light valve comprising: successive layers of:
   a transparent conductive electrode,
   a photosensitive material,
   a light blocking layer,
   a dielectric mirror,
   a first alignment film,
   a liquid crystal,
   a second alignment film, and
   a counter electrode; and
   means for establishing an AC current across said layers between said electrodes,
      wherein said photosensitive material generating a DC voltage in the presence of input illumination, and
      said liquid crystal layer having a resistant that is at least about 100 times less than the resistance of one of said light blocking layer and said dielectric mirror.

7. The liquid crystal light valve of claim 6 wherein said photosensitive material comprises a layer of amorphous silicon.

8. The liquid crystal light valve of claim 6 wherein said light blocking layer comprises a layer of cadmium telluride.

9. The liquid crystal light valve of claim 6 wherein said mirror comprises a layer of silicon dioxide.

10. The liquid crystal light valve of claim 6 wherein said mirror comprises a layer of titanium dioxide.

11. The liquid crystal light valve of claim 6 wherein said mirror has a resistivity of about $1 \times 10^{14}$ ohm-cm, and wherein said liquid crystal has a resistivity of not more than about $5 \times 10^{10}$ ohm-cm.

12. An AC biased liquid crystal field effect light valve comprising:
   a plurality of layers sandwiched together, said layers including:
      a photosensitive layer having a resistivity of about $1 \times 10^{12}$ ohm-cm,
      a light blocking layer having a resistivity of about $1 \times 10^{10}$ ohm-cm,
      a mirror layer having a resistivity of about $1 \times 10^{14}$ ohm-cm, and
      a liquid crystal layer having a predetermined response time and having a resistivity that provides a liquid layer time constant nearly equal to said response time; and
      means for establishing an AC current across said plurality of layers.

13. The liquid crystal light valve of claim 12 wherein said liquid crystal layer has a resistivity of about $2.5 \times 10^9$ ohm-cm.

14. In an AC biased liquid crystal field effect light valve having a plurality of layers including a liquid crystal layer having a predetermined response time, and a photosensitive layer that internally generates a DC voltage in the presence of input illumination, which DC voltage causes optical overshoot, a method for reducing optical overshoot caused by the DC voltage internally generated in the AC biased light valve, said method being characterized by doping the material of the liquid crystal layer to lower the resistivity of the liquid crystal layer by at least 100 times.

* * * * *